US009464338B2

(12) United States Patent
Hendrickson et al.

(10) Patent No.: US 9,464,338 B2
(45) Date of Patent: Oct. 11, 2016

(54) RECLAIMING AND INHIBITING ACTIVATION OF DRI DUST AND FINES

(71) Applicant: NU-IRON TECHNOLOGY, LLC, Charlotte, NC (US)

(72) Inventors: David Hendrickson, Coleraine, MN (US); John Brandon, Charlotte, NC (US); Les Hart, Baton Rouge, LA (US); John Anderson, Madison, AL (US)

(73) Assignee: Nu-Iron Technology, LLC, Charlotte, NC (US)

( * ) Notice: Subject to any disclaimer, the term of this patent is extended or adjusted under 35 U.S.C. 154(b) by 104 days.

(21) Appl. No.: 14/202,412

(22) Filed: Mar. 10, 2014

(65) Prior Publication Data

US 2014/0182417 A1     Jul. 3, 2014

Related U.S. Application Data

(63) Continuation-in-part of application No. 13/889,684, filed on May 8, 2013, now Pat. No. 9,045,809, which is a continuation of application No. PCT/US2013/039767, filed on May 6, 2013.

(60) Provisional application No. 61/643,259, filed on May 5, 2012.

(51) Int. Cl.
  *C22B 1/16*        (2006.01)
  *C21B 13/00*       (2006.01)
  (Continued)

(52) U.S. Cl.
  CPC . *C22B 1/16* (2013.01); *B05D 1/40* (2013.01); *B05D 7/14* (2013.01); *C21B 13/0093* (2013.01); *C22B 1/244* (2013.01); *C23F 15/00* (2013.01); *Y02P 10/136* (2015.11)

(58) Field of Classification Search
  CPC . C21B 12/0093; C21B 13/0093; C22B 1/16; C22B 1/244; B05D 1/40; B05D 7/14; C23F 15/00
  See application file for complete search history.

(56) References Cited

U.S. PATENT DOCUMENTS 2,874,037 A    2/1959  Fisher
3,407,089 A   10/1968  Sampson
(Continued)

FOREIGN PATENT DOCUMENTS

EP         0203855        5/1985
WO         2003052149    12/2001
WO     WO 03052149 A1 *  6/2003
WO     WO 2012034015 A1 * 3/2012 ............. C21B 11/06

OTHER PUBLICATIONS

"Paraffin Hydrocarbon | Chemical Compound." Encyclopedia Britannica Online. Encyclopedia Britannica, 2015. Web. Sep. 15, 2015. <http://www.britannica.com/science/paraffin-hydrocarbon>.*

(Continued)

*Primary Examiner* — George Wyszomierski
*Assistant Examiner* — Tima M McGuthry Banks
(74) *Attorney, Agent, or Firm* — Hahn, Loeser & Parks, LLP; Arland T. Stein; Lorraine Hernandez (57) ABSTRACT

Method of reclaiming and inhibiting activation of DRI fines is disclosed comprising the steps of forming a moving stream or pile containing DRI pellets and DRI fines, coating the moving stream or the pile of DRI pellets and DRI fines with a coating material comprising an alkane mixture in the C15 to C40 range to form a coating on the DRI pellets and DRI fines and cause DRI fines to adhere together and to the DRI pellets to form a plurality of agglomerates, and moving the agglomerates of coated DRI pellets and coated DRI fines to a facility for use in making steel. The coating material may be applied to coat the DRI pellets and DRI fines at a rate between 0.2 and 2.0 gallons per ton of DRI processed. The coating material may be mineral oil.

24 Claims, 9 Drawing Sheets

(51) Int. Cl.
    *C22B 1/244*     (2006.01)
    *B05D 1/40*     (2006.01)
    *B05D 7/14*     (2006.01)
    *C23F 15/00*     (2006.01)

(56) References Cited

U.S. PATENT DOCUMENTS

| | | | |
|---|---|---|---|
| 3,520,676 A | | 7/1970 | Stahr |
| 3,556,838 A | | 1/1971 | Segura |
| 4,030,913 A | | 6/1977 | Wegener |
| 4,069,015 A | | 1/1978 | Ahrendt et al. |
| 4,070,180 A | | 1/1978 | Waslo |
| 4,329,168 A | | 5/1982 | Rubio |
| 4,407,864 A | * | 10/1983 | Stift .................... C21B 13/0086 427/216 |
| 4,692,353 A | * | 9/1987 | Ahmed .................... B05D 1/18 427/156 |
| 6,048,382 A | | 4/2000 | Greenwalt |

OTHER PUBLICATIONS

Helmenstine, Anne Marie, Ph.D. "Olei Acid Chemical Structure." Chemical Structures Starting with the Letter O. About.com, 2015. Web. Sep. 15, 2015. <http://chemistry.about.com/od/factsstructures/ig/Chemical-Structures---O/Oleic-Acid.htm>.*

"Mineral Oil, Light Viscosity Range, NF." Http://www.sciencelab.com/page/S/PVAR/23050/SLM1027. Science Lab, 2005. Web. 15 Sep. 2015. <http://www.sciencelab.com/page/S/PVAR/23050/SLM1027>.*

Skuld News—Circulars Dec. 1997. Jorgensen. (Dec. 15, 1997) Loss prevention advice on carriage of DRI. http://www.skuld.com/topics/cargo/dangerous-cargo/dri/Loss-Prevention-Advice-on-Carriage-of-Direct-Reduced-Iron-DRI/.

webpage. Hot Briquetted Iron Association (2009). Guide for handling, maritime carriage, and storage of DRI.

Gard webpage. Gard. (2010) DRI. www.gard.no/.../The%20carriage%20of%20D.

* cited by examiner

RECLAIMING AND INHIBITING ACTIVATION OF DRI DUST AND FINES

CROSS-REFERENCE TO RELATED APPLICATIONS

This application is a continuation-in-part of U.S. patent application Ser. No. 13/889,684, filed on May 8, 2013, now U.S. Pat. No. 9,045,809, which is a continuation of patent application No. PCF/US2013/039767 filed on May 6, 2013, which claims priority to and the benefit of provisional U.S. Patent Application No. 61/643,259 filed on May 5, 2012.

BACKGROUND AND SUMMARY OF THE DISCLOSURE

The present disclosure relates to systems and methods for making direct reduced iron. Direct reduced iron (DRI) is a commercial product of more than 80% metallic iron, and, typically, more than 90% metallic iron, widely used as a source material for making steel. The remainder of the DRI product is gangue, which is high in silica. The conventional techniques for making steel involve the use of an electric arc furnace (EAF) or a basic oxygen furnace (BOF). DRI is typically higher in iron units than taconite pellets and other sources of iron, and can be used as a partial substitute for scrap in production of steel by EAF.

DRI may be formed from beneficiated iron ore, such as taconite pellets. For example, taconite has been mined and crushed, and the iron containing portions magnetically separated from the non-magnetic portions to form a beneficiated product substantially higher in iron content than mined taconite. The beneficiated iron ore portion may be formed into pellets by pelletizing, and heated in a linear hearth furnace (LHF) in the presence of a reducing agent (e.g., carbonaceous material) to a temperature below the melting point of iron using natural gas, propane, or coal to promote the reduction of iron ore to form DRI.

In the process to make DRI, the beneficiated and pelletized iron oxide containing material is moved through a furnace mixed sometimes with a reducing agent, such as coal, coke, or another form of carbonaceous material. A desulfurizing agent, such as limestone or dolomite, may also be added. The iron oxide material reacts chemically in the reducing zone of the furnace to partially reduce the iron oxide to form DRI.

DRI is difficult to transport because it is highly reactive with oxygen in air and moisture. The DRI, known as sponge iron, has a high porosity with many voids making it porous in nature. With the high porosity of DRI, it has low compressive strength. When the DRI is stored, for example, in the hold of a ship or barge during transportation, some of the pellets have been prone to break apart under the weight of pellets above them, further promoting the likelihood of the DRI reacting with oxygen and moisture around it. Additionally, the rough surface characteristics of the DRI pellets produce particulate matter and other fines having a high surface area, which also promoted the likelihood of the DRI reacting with the oxygen and moisture around it. Such particulate matter and fines typically are produced throughout the transportation and storage of the DRI, making it difficult to transport DRI over long distances and to store DRI for long periods.

DRI is usually made, transported, and stored in the form of DRI pellets, accompanied by DRI dust and other DRI fines. The porous, low internal strength, and flakey nature of such DRI compacts work to increase the surface area of the compact that is exposed to an oxidizing atmosphere and moisture, resulting in substantial and rapid oxidation (rusting). The amount of DRI fines is thus increased during transportation and storage of the DRI product before delivery to the steelmaking furnace. The reactions that occur during DRI oxidation produce heat and hydrogen, making DRI susceptible to overheating and combustion. The temperature in containers storing DRI, in which air is free to circulate, can reach 1200° F. Such combustion may cause fires in the holds of ships and barges during transportation of DRI and even in the clam shell buckets of cranes when unloading DRI. These circumstances have substantially increased the cost of DRI product delivered to a steel plant because of the losses in handling and hazards encountered during transportation and storage. Due to the difficulties and risks associated with transporting DRI product, production of DRI has, with a few exceptions, been generally located near the steelmaking facilities and near the time of use in steelmaking, rather than in more economical locations and times.

Consequently, various techniques have been used in the past to passivate DRI to reduce the risks associated with its pyrophoric properties. Examples of such passivation chemistry used in the past include aqueous solutions of a water soluble alkali metal silicate coating, organic amine vapors or aqueous solution of organic amines coating, petroleum wax with a solid polymer of an olefin having 2 to 4 carbon atoms coatings, water soluble stearates and like water repellent additive coating, hydrated calcined limestone (lime dust) coating, polymerizing aliphatic 1-olefin of less than 6 carbon atoms with catalytic material coating, ferrific chromium containing alloy coating, naphthenic petroleum/glycerol monoester coating and heated paraffin wax coating.

Natural triglycerides such as soybean oil, sunflower oil, coconut oil, cottonseed oil, and castor oil have also been proposed as a nonaqueous foam for use as a dust suppressant with iron ore pellets. See WO 2006/010721. These dust suppressants are typically applied in the presence of a surfactant such HCF-740, a mixture of florosurfactants and hydrocarbon solvents, HCF-730, a nonionic mixture of silane surfactants, HCF-720, a nonionic mixture of silane surfactants and fluorosurfactants, or HCF-710 a nonionic mixture of silane surfactants and sulfonic acids. Id at 4. Such surfactants have been proposed to be used in amounts of 0.2 to 5% by weight per weight of DRI dust or fines. While iron ores are generally relatively stable oxides, DRI pellets and DRI fines generally have high porosity and high reactive surfaces, and known as sponge iron. Accordingly, DRI pellets and DRI fines in the presence of these natural triglycerides tend to break down the triglycerides producing high levels of CO, which is highly undesirable with transportation of DRI.

Moreover, such treatment techniques generally have involved separation of the dust and other fine particles from the DRI pellets, and discarding the separated fines as waste. This involved reduction in yield and loss of iron units because the dust and other fines were fugitive and not recovered.

Despite various attempts, there still remains a need for an economic and efficient way of passivating DRI pellets so they can be safely transported over long distances in bulk and stored in bulk. A strong, stable and pyrophobic product would enable the safe transport and storage of DRI, substantially increasing its usefulness and effectiveness in steelmaking. A need has existed for both reclaiming and inhibiting activation of the iron units of DRI fines to improve the efficiency of the use of DRI pellets in steelmaking, while reducing the risks in transportation and handling of DRI pellets.

Disclosed is a method of reclaiming and inhibiting activation of DRI fines comprising the steps of: (a) forming a moving stream containing DRI pellets and DRI fines; (b) coating DRI pellets and DRI fines with a coating material comprising a mixture of alkanes in the C15 to C40 range to form a coating on the DRI pellets and DRI fines and cause DRI fines to adhere together and to the DRI pellets to form a plurality of agglomerates; and (c) moving the agglomerates of coated DRI pellets and coated DRI fines to a facility for use in making steel.

The coating material may comprise a mixture of alkanes in the C18 to C35 range from a non-vegetable source. In some embodiments, the coating material may be at room temperature. In other embodiments, the coating material may be heated before application.

The coating material may be mineral oil. Mineral oil prevents the absorption of moisture from the atmosphere. Mineral oil may have a viscosity of 70 SUS at 100° F./5=cSt at 40° C. The viscosity of a fluid is a measure of its resistance to gradual deformation by shear stress or tensile stress. A fluid with a very high viscosity will appear to be a solid in the short term. A liquid whose viscosity is less than that of water is sometimes known as a mobile liquid, while a substance with a viscosity substantially greater than water is called a viscous liquid.

The coating material may also include paraffinic oils. Paraffinic oils are based chemically on n-alkanes. Paraffinic oils are straight chain or branched aliphatic hydrocarbons belonging to the series with the general formula $C_nH_{2n+2}$. Paraffinic oils are saturated with respect to hydrogen. A typical paraffinic oil molecule with 25 carbon and 52 hydrogen atoms has a molecular weight of 352. Very high molecular weight paraffins are solid waxes, also dissolved in small amounts of mineral oils. Paraffins are relatively unreactive and thus have better oxidation stability compared to naphthenes. Thus, they can be used longer at higher temperatures.

Irrespective of the composition of the particular coating material used in the present method, the method may be practiced by coating DRI pellets and DRI fines to form DRI agglomerates. The method may include forming a moving stream containing DRI pellets and DRI fines. The moving stream of DRI pellets and DRI fines may be a falling stream when the step of coating occurs. The coating material may be delivered in different droplet sizes usually at the same time to facilitate efficient coverage of the DRI fines and to facilitate coverage of the DRI pellets with the coating material. The coating material may be applied at a rate between 0.2 and 2.0 gallons per ton of DRI coated, or between 0.4 and 1.0 gallon per ton of DRI coated. In one embodiment, the coating material may be a liquid or semi-liquid applied at a rate less than 0.2% by weight per ton of pellets and fines coated. In another embodiment, the coating material may be a liquid or semi-liquid applied at a rate between 0.005 and 0.45% by weight per ton of pellets and fines coated.

Alternatively, disclosed is a method of reclaiming and inhibiting activation of DRI fines comprising the steps of (a) coating with a coating material a pile of DRI pellets and DRI fines while DRI pellets and DRI fines are added to or removed from the pile, said coating material comprising an alkane mixture in the C15 to C40 range, causing DRI fines to adhere together and optionally to the DRI pellets to form a plurality of DRI agglomerates; and (b) moving the DRI agglomerates formed from coated DRI pellets and coated DRI fines to a facility for use in making steel.

Again, the coating material may comprise of an alkane mixture in the C18 to C53 range. The coating material may be heated before application to form a liquid or semi-liquid before or during the step of coating, and may be with different droplet sizes to facilitate coverage of both DRI pellets and DRI fines before or during the step of coating. The coating material may be applied at a rate less than 0.2% or may be applied at a rate between 0.005 and 0.45% by weight per ton of DRI pellets and DRI fines coated. In any case, the coating material may be applied at a rate less than 0.2% of DRI coated or may be applied at a rate between 0.005 and 0.45% by weight per ton of pellets and fines coated. The coating material may be applied at a rate between 0.2 and 2.0 gallons per ton of coated DRI coated, or between 0.4 and 1.0 gallon per ton of DRI coated.

In yet another alternative, disclosed is a method of reclaiming and inhibiting activation of DRI fines comprising the steps of: (a) coating DRI fines with a coating material comprising an alkane mixture in the C15 to C40 range to form a coating on the DRI fines and cause DRI fines to adhere together and optionally to DRI pellets to form a plurality of agglomerates; and (b) moving the agglomerates containing coated DRI pellets to a facility for use in making steel.

In an embodiment, the present method may be practiced by collecting the DRI fines before the step of coating, and the collected DRI fines may be coated and form DRI agglomerates. The DRI may comprise more than 90% metallic iron. The coated DRI agglomerates may be directly used in steelmaking, or, the coated DRI agglomerates formed from the DRI fines may be added to uncoated DRI pellets and DRI fines, or DRI fines, to facilitate coating of the uncoated DRI pellets and/or DRI fines with the coating material comprising an alkane mixture, and cause the DRI fines to adhere together and optionally to DRI pellets to form a plurality of additional DRI agglomerates. This embodiment reduces the amount of coating material that is used in efficiently practicing the present method of reclaiming and inhibiting activation of DRI fines.

BRIEF DESCRIPTION OF THE DRAWINGS

The operation and application of the method for reclaiming and inhibiting activation of DRI fines is further described with reference to particular embodiments in relation to the accompanying drawings, in which:

DETAILED DESCRIPTION OF THE DRAWINGS

Presently disclosed is a method of reclaiming and inhibiting activation of DRI fines. A method of reclaiming and inhibiting activation of DRI fines may comprise the steps of forming a moving stream containing DRI pellets and DRI fines, coating the moving stream of DRI pellets and DRI fines with a coating material comprising an alkane mixture in the C15 to C40 range to form a coating on the DRI pellets and DRI fines causing the DRI fines to adhere together and to the DRI pellets to form a plurality of DRI agglomerates, and thereafter moving the DRI agglomerates to a facility for use in making steel. It should be noted that the DRI pellets may be not only those formed by traditional pelletizing equipment, but also other forms of DRI compacts, such as briquettes, prepared by other available compacting methods and equipment.

Figure 1:
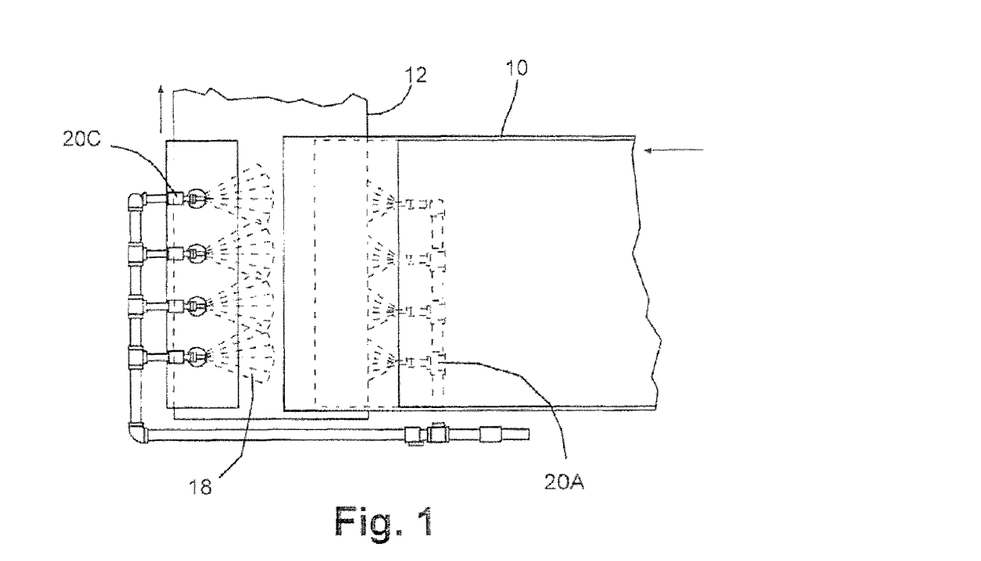
FIG. 1 is a top view illustrating an embodiment of a method for reclaiming DRI fines.
Figure 2:
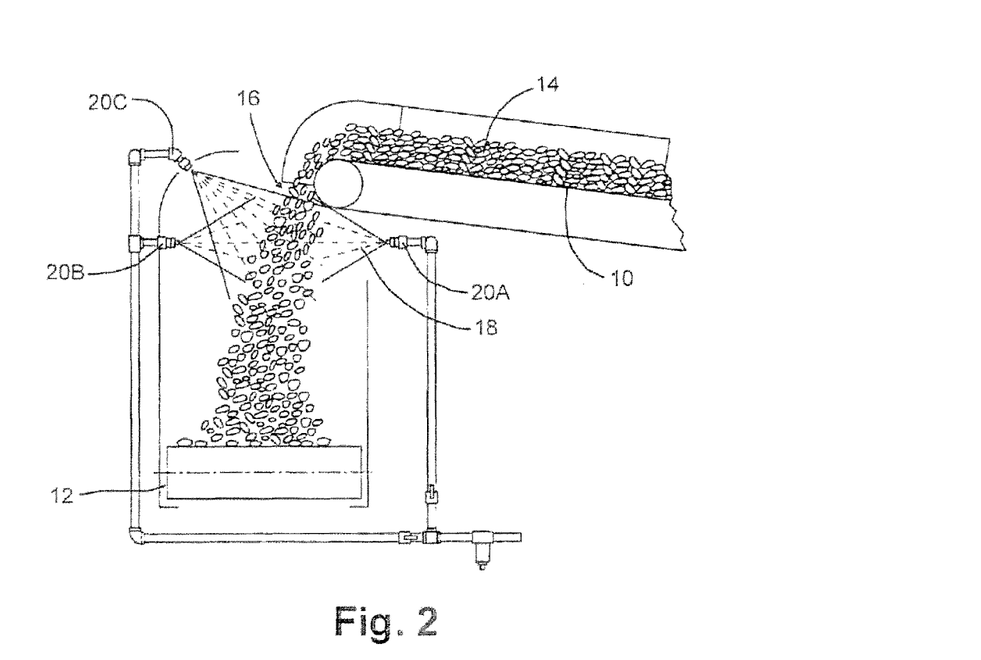
FIG. 2 is a side view of the embodiment described in FIG. 1.

Referring to FIGS. 1 and 2, uncoated DRI pellets and DRI fines moving in a moving stream 14 on first conveyor 10 are discharged from first conveyor 10 in a falling moving stream 16 to a second conveyor 12. The moving stream 16 of DRI pellets and DRI fines is sprayed with a coating material 18 comprising an alkane mixture by one or more spray nozzles 20A, 20B and 20C shown in FIG. 2. The speed of the first conveyor 10 and the rate of flow of coating material 18 of alkane mixture from the spray nozzles are coordinated to provide effective coating of the moving stream 16 of DRI pellets and DRI fines. The moving stream 16 may be less than 6 inches thick or less than 4 inches thick. The speed of the first conveyor 10 is adjusted to provide the desired thickness and the flow of coating material is regulated to provide for effective coating of the moving stream 16 of DRI pellets and DRI fines to form the DRI agglomerates without excessive coating or wasting of the coating material.

Referring specifically to FIG. 2, as the DRI pellets and DRI fines fall from the first conveyor 10 to the second conveyor 12, the coating material 18 is applied to the moving stream 16 of the DRI pellets and DRI fines. In some embodiments, the coating material 18 is applied to the falling stream from more than one side as through spray nozzles 20A and 20B as shown in FIG. 2. However, multiple spray nozzles 20A and 20B or spray nozzles 20A, 20B and 20C, or some other arrangement of spray nozzles, may be used to provide efficient delivery of coating material 18 to the falling stream 16. The coating material 18 adheres to the DRI pellets and DRI fines to form a plurality of DRI agglomerates reclaiming the DRI fines for use in steelmaking. The flow rate of coating material 18 and speed of first conveyor 10 can be regulated during operation to provide effective formation of the plurality of DRI agglomerates.

Figure 3:
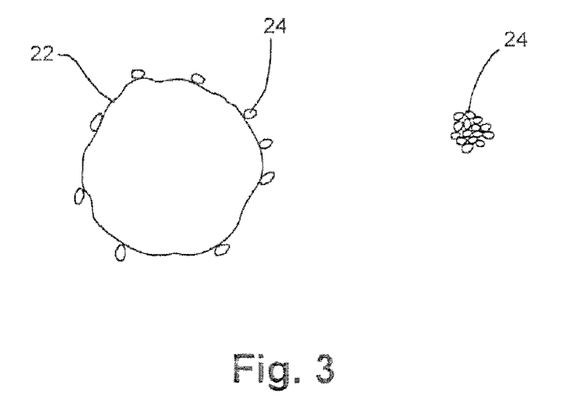
FIG. 3 is a side view illustration of DRI agglomerates formed from DRI pellets and DRI fines or DRI fines.

As illustrated in FIG. 3, DRI fines 24 adhere to DRI pellets 22 and/or other DRI fines 24 by the coating material 18 when applied as shown, for example, in FIGS. 1 and 2. The coating material may be heated before, during, and/or after application to the DRI pellets and DRI fines so that after applied and cooled, the coating material firmly adheres to the pellets and fines and causes the DRI fines to adhere together and to the DRI pellets. The coating material also tends to close the pores of the DRI pellets and DRI fines to inhibit activation of the DRI on exposure to oxygen, for example, in air or moisture.

The application of coating material containing an alkane mixture to the DRI pellets and DRI fines causes the DRI fines to form DRI agglomerates of DRI pellets and DRI fines or DRI fines alone. Once coated with the coating material, DRI fines adhere to DRI pellets and other DRI fines forming a plurality of DRI agglomerates. These DRI agglomerates reduce the loss of iron units by decreasing the fugitive dust emissions. In addition, the DRI agglomeration decreases the risks associated with the pyrophoric properties of DRI and improve its compressive strength, making the DRI agglomerates more stable and safer to transport, and provides a DRI agglomerate product that can be transported and handled with substantially reduced risk of fires and the like.

In any case, the coating material may be applied at a rate less than 0.2% by weight or may be applied at between 0.005 and 0.45% by weight per ton of pellets and fines coated. The coating material may be applied at a rate between 0.2 and 2.0 gallons per ton of coated DRI coated, or may be applied at a rate between 0.4 and 1.0 gallon per ton of DRI coated as desired to effectively coat the DRI.

Figure 4:
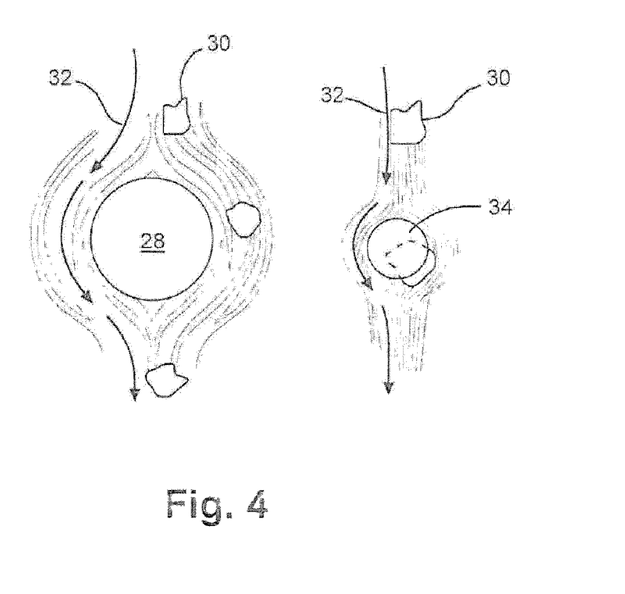
FIG. 4 is an illustration of the effect of droplet size in coating DRI pellets and DRI fines.

Referring to FIG. 4, the coating material containing an alkane mixture may be applied to the DRI pellets and DRI fines in different size droplets. If the droplet size 28 is substantially larger than the DRI fines particle 30, the particles of DRI fines will follow the air stream 32 around the droplet of the coating material. If the sizes of the droplets 34 of coating material and the fines particles are comparable, then particles 30 of DRI fines will follow the air stream 32 and collide with the droplet coating material. To promote the adhesion of the coating material to the DRI pellets or DRI fines, the droplet size of the coating material may be equal to or smaller than the particle size of the DRI pellets or DRI fines to be coated. For example, the coating material may be applied in a mist having an average droplet size of 1 μm to facilitate the coating of the DRI fines. In addition, larger droplet sizes may be applied to facilitate coating of the larger DRI pellets. Both large droplets and small droplets in the mist may be used to achieve the desired coating for the DRI pellets and DRI fines.

Figure 5:
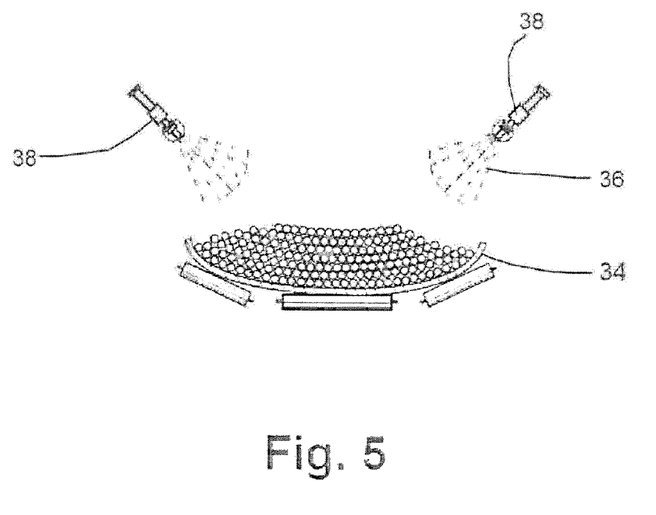
FIG. 5 is a perspective view of another embodiment of a method for reclaiming DRI fines.

In an alternative embodiment, the coating material 36 may be applied to the DRI pellets with accompanying fines on belt conveyor 34 as it moves away in a moving stream, as shown in FIG. 5 from a DRI furnace (not shown). DRI pellets with accompanying DRI fines are produced from a DRI furnace in a continuous flow along conveyor 34. The DRI furnace may be a Midrex® stack furnace as described in U.S. Pat. Nos. 3,749,386, 3,748,120, or 6,214,086, or any other furnace suitable for making DRI pellets. In any case, the coating material 36 containing alkane mixture is applied to the moving stream of DRI pellets and DRI fines moving along conveyor 34 away from the DRI furnace. The coating material 36 containing alkane mixture may be applied to coat the DRI pellets and DRI fines at a temperature below 45° C. or at temperatures approaching ambient temperature. The alkane mixture coating material 36 may be applied to DRI pellets and DRI fines as they move past the spraying nozzle(s) 38 directed to deliver the coating material 36 toward conveyor 34. Here again, the speed of conveyor 34 and flow of coating material 36 from spraying nozzle(s) 38 are coordinated to provide effective coating of DRI pellets and DRI fines, and cause adherence as shown in FIG. 3. DRI agglomerates are formed from the DRI pellets and DRI fines as they move along conveyor 34. The DRI agglomerates may be directly transported to an EAF steelmaking facility with reduced fugitive dust emissions to reclaim the iron units associated with the DRI fines. Alternatively, the DRI agglomerates may be transported on conveyor 34 to a ship, barge, dump truck or train hopper car for transportation to an EAF facility or to a storage facility to await use in steelmaking.

Figure 6:
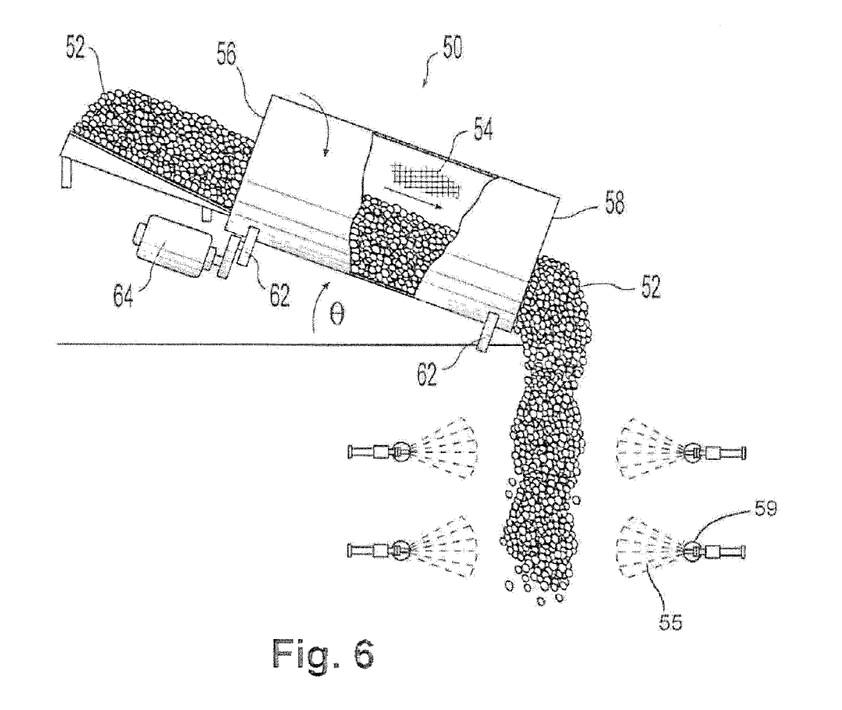
FIG. 6 is an illustration of an alternative embodiment of a method for reclaiming DRI fines.

In another embodiment illustrated in FIG. 6, DRI fines may be separated from the DRI pellets 52 in a rotary chamber 50 before being sprayed with the coating material (not shown). As shown in FIG. 6, the cylindrical chamber 50 is illustrated having a feed end 56 and a discharge end 58. The chamber 50 has a screen 54 relieved across the inner surface of the chamber 50 as described in more detail in provisional application Ser. No. 61/381,907 filed Sep. 10, 2010. The moving stream 52 of DRI pellets and DRI fines typically from a nearby DRI furnace are delivered by a belt conveyor to rotary chamber 50 at the feed end 56. The moving stream 52 of pellets entering the chamber 50 is tumbled on the screen 54 as the chamber rotates, causing the segregation of the DRI pellets and DRI fines. The chamber 50 may be inclined by an angle θ, regulated to adjust the speed of the moving stream 52, to facilitate movement of the DRI pellets through the chamber as the chamber rotates. Not shown, DRI fines may be collected and coated with a coating material comprising an alkane mixture to agglomerate the DRI fines. The separated and agglomerated DRI fines may be transported directly to an EAF for steelmaking or the agglomerated DRI fines may be added back to the moving stream 52 of DRI pellets downstream of the rotary chamber 50 to improve the efficiency of coating of the DRI pellets and DRI fines with coating material. Alternatively, the agglomerated DRI fines may be remixed with the moving stream 52 of uncoated DRI pellets and DRI fines before entering the chamber 50 so that the coating material from the coated DRI fines adheres to at least a portion of the uncoated DRI pellets and DRI fines in forming agglomerates and improves the efficiency of coating of the uncoated DRI pellets and DRI fines with coating material. The DRI pellets are also polished in rotary chamber 50. In any case, the agglomerated DRI pellets and DRI fines may be additionally sprayed with coating material 55 from spray nozzles 59 as the moving stream of DRI pellets and remaining DRI fines fall in leaving rotary chamber 50, and are transported to an EAF for steelmaking with reduced fugitive fines emissions and reduced loss of iron units.

Figure 7:
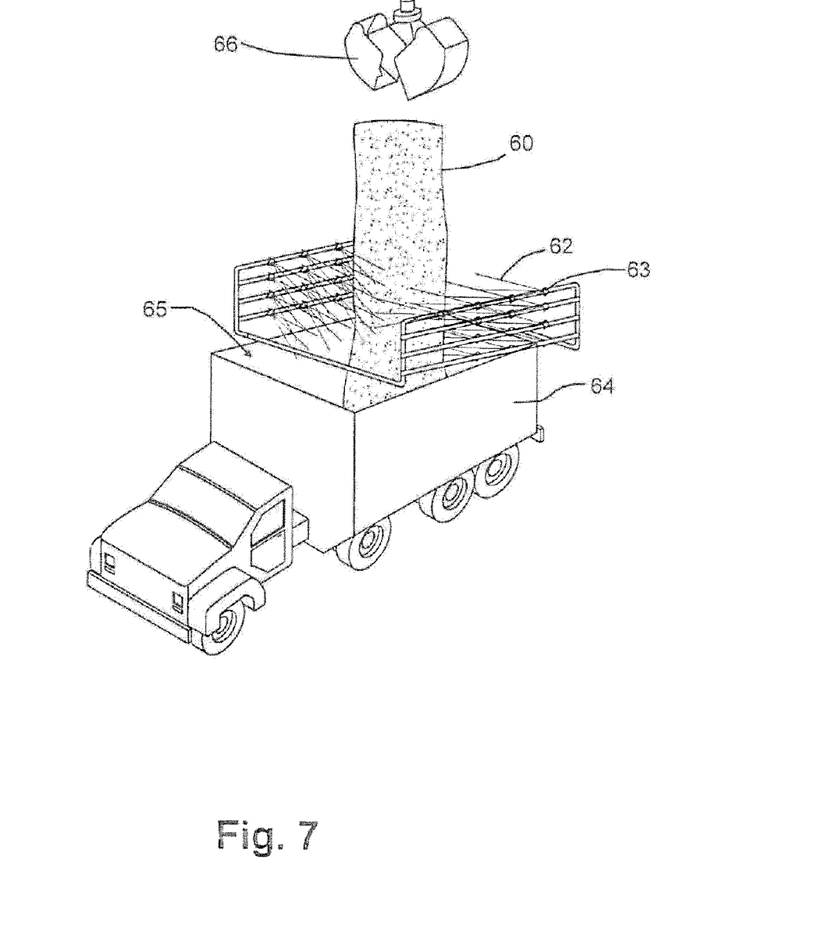
FIG. 7 is an illustration of another alternative embodiment of a method for reclaiming DRI fines.

Referring to FIG. 7, in another embodiment, the DRI pellets and DRI fines 60 may be sprayed with coating material 62 through spray nozzle 63, while being deposited in a pile in dump truck 64 for transportation. Uncoated DRI pellets and DRI fines may be transferred from a ship or barge hold to truck 64 for delivery to a steelmaking facility. The DRI pellets and DRI fines are removed from the barge ship hold by a crane (not shown) having a clam shell 66 or other bucket. The clam shell 66 releases the uncoated DRI 60 into the pile in the truck bed 65 such that the DRI pellets and DRI fines are coated by coating material 62 as they fall and distribute in the pile within the truck bed 65. The amount and speed of release of DRI pellets and DRI fines from the clam shell 66 and the rate flow of coating material 62 through spray nozzle 63 is regulated and controlled to provide for efficient coating of DRI pellets and DRI fines and formation of DRI agglomerates as shown in FIG. 3 facilitated by movement of the pile and the truck during loading and as the truck travels to the steelmaking facility.

Figure 8:
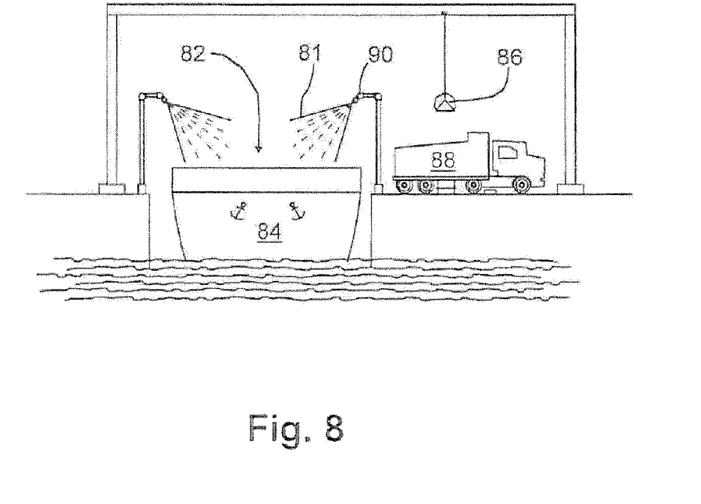
FIG. 8 is a view of yet another embodiment of a method for reclaiming DRI fines.

In another alternative embodiment, as illustrated in FIG. 8, DRI pellets and DRI fines may be coated with a coating material 81 comprising an alkane mixture delivered to coat the DRI pellets and DRI fines during removal from a pile in the hold 82 of a ship or barge 84 by clam shell 86 or the like and deposited in a dump truck 88 (e.g. as shown in FIG. 7) for transport to a steelmaking facility. In this embodiment, the uncoated DRI pellets and DRI fines may be initially stationary in a pile in the hold 82 of the ship or barge 84 and the coating material 81 is sprayed onto the DRI pellets and DRI fines by spray nozzles 90 directed at the exposed portions of DRI pellets and DRI fines in the pile in the hold 82, as the clam shell 86 removes in loads the DRI pellets and DRI fines from the hold 82 and deposits the same in the dump bed of truck 88. The coating material 81 coats the exposed portion of the DRI pellets and DRI fines as the material is removed from the hold 82. The movement of the coated DRI pellets and DRI fines as the clam shell 86 operates causes the DRI fines to adhere to the DRI pellets and other DRI fines to form DRI agglomerates which are taken away by the clam shell 86. Also, the coated DRI pellets and DRI fines 80 come into contact with the uncoated DRI pellets and DRI fines 80, which are exposed as material is removed from the hold 82, causing the previously uncoated DRI pellets and DRI fines to become exposed and coated with coating material 81, and in turn causing those DRI fines to adhere to the DRI pellets and other DRI fines as shown in FIG. 3. In this embodiment, the flow rate of coating material 81 through nozzles 90 is coordinated with the rate of removal of material from the pile in the hold 82 to provide for effective coating of the DRI pellets and DRI fines with the coating material 81 and form a plurality of DRI agglomerates effectively reducing fugitive fines emissions and reclaiming iron units that would otherwise be lost as DRI fines emission.

Figure 9:
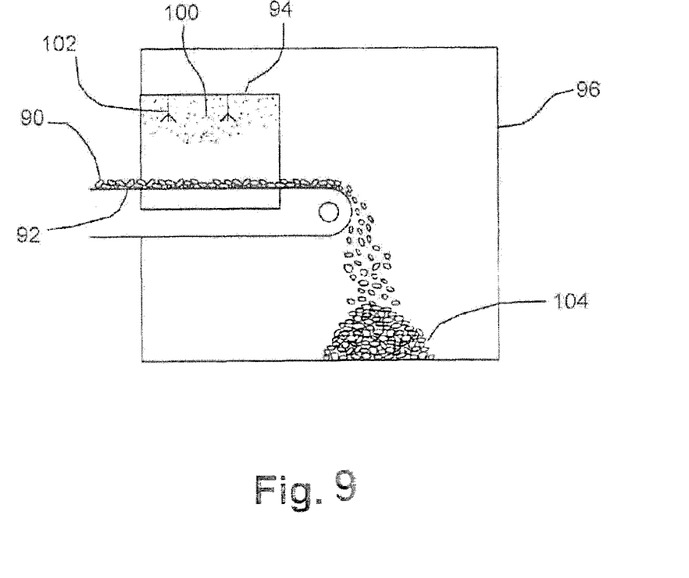
FIG. 9 is an illustration of yet another embodiment of a method for reclaiming DRI fines.
Figure 10:
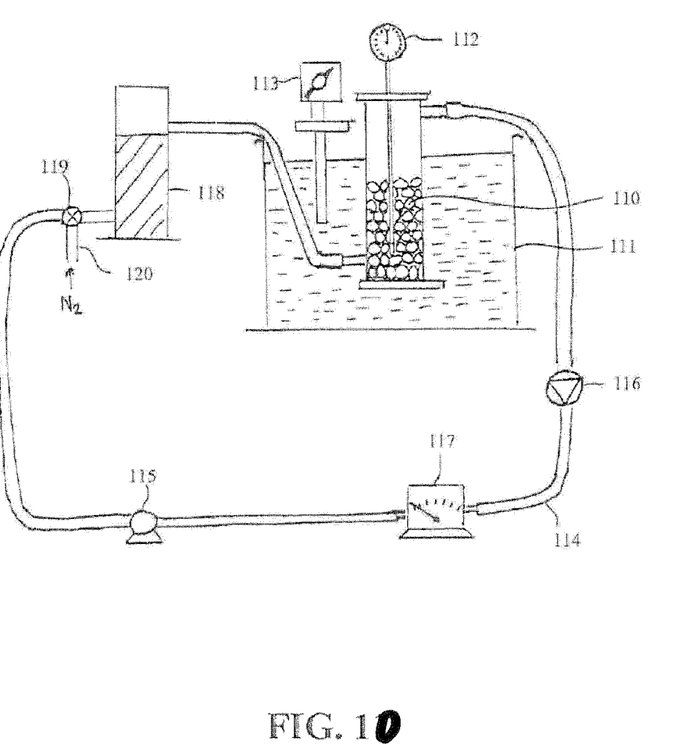
FIG. 10 is an illustration of the apparatus used to measure the reactivity of DRI pellets and DRI fines where coated with coating material in accordance with the present invention.

Referring to FIG. 9, another embodiment of the method for reclaiming and inhibiting activation of DRI fines is illustrated where a moving stream 90 of DRI pellets and DRI fines is transported on conveyor 92 into a storage building 96 in proximity to an EAF steelmaking facility. A shroud 94 is provided at a transfer location as moving stream 90 on the conveyor 92 enters the storage building 96. Alternatively, the shroud 94 may be located outside the storage building 96 as desired. In any case, the moving stream 90 of DRI pellets and DRI fines on conveyor 92 passes through the shroud 94. A spray in the form of a fog of coating material 100 containing an alkane mixture is provided through nozzles 102 in the shroud 94 to coat the moving stream 90 of DRI pellets and DRI fines as they enter the storage building 96 and cause the DRI fines to adhere to the DRI pellets and other DRI fines to form DRI agglomerates reclaiming the DRI fines in storage pile 104 in storage building 96 for use in steelmaking.

Irrespective of the composition of the particular coating material used in the present method, the method may be practiced by coating DRI pellets and DRI fines to form DRI agglomerates. The coating material may be delivered in different droplet sizes usually at the same time to facilitate efficient coverage of the DRI fines and to facilitate coverage of the DRI pellets with the coating material. Other embodiments in which the present method of reclaiming DRI may be implemented are set forth in greater detail below.

As previously observed, the level of the coating material is typically low between 0.2 and 2.0 gallons per ton of DRI processed. In one embodiment, the low levels of coating material may be between 0.4 to 1.0 gallon per ton of DRI processed and substantially reduce the amount of fugitive dust emissions. The coating with the coating material of alkane mixture as described above in an amount of 2% or less by weight decreased the reactivity of the DRI fines. Moreover, the coating material is effective in forming DRI agglomerates of DRI pellets with DRI pellets and/or other DRI fines and reclaiming of iron units for processing in the EAF that would otherwise have been lost in handling. Further, the coating material of alkane mixture coats the DRI pellets, DRI fines and formed DRI agglomerates with a moisture resistant coating which retards the corrosive reactivity and reduces the risk of combustion in the DRI during in subsequent transportation, handling, and storage. In addition, the coating material of alkane mixture is low cost and readily available, and can be applied to coat the DRI pellets and DRI fines simply through conventional spray nozzles as shown for example in FIG. 2. The coating material also is biodegradable and can be consumed in the EAF. In short, the present method of reclaiming DRI fines is a low cost way of reducing fugitive emissions, reducing the reactivity of DRI fines and DRI pellets, and reclaiming iron units for use in the steelmaking processes.

The formation of carbon monoxide (CO) should also be taken in consideration when selecting a coating material. Carbon monoxide is not only toxic but also flammable. Various test were performed to determine the CO content in treated DRI. DRI pellets were coated with palm oil ($C_{55}H_{96}O_6$) at a rate of 1 Gal/ton. The palm oil treated DRI pellets were placed in a sealed steel drum. The sealed steel drum was then placed in an electrically heated oven and heated to 135° F. The CO content was analyzed and measured at different times by pulling gas samples through Sensidyne analysis columns. As summarized in Table 1 below, the CO content in the DRI pellets coated with palm oil significantly increased with time. After 4 hrs, the CO content in the sealed drum with DRI coated with palm oil was 100 ppm. After 24 hrs, the CO content doubled to 200 ppm. After another 24 hrs (i.e. 48 hrs), the CO content had more than tripled to 1000 ppm. And after 72 hrs, the CO content remained constant at 1150 ppm.

TABLE 1

| Reaction time | CO content |
| --- | --- |
| 4 hrs | 100 ppm |
| 24 hrs | 200 ppm |
| 48 hrs | 1000 ppm |
| 52 hrs | 1150 ppm |
| 70 hrs | 1150 ppm |

The same test was performed for DRI coated with mineral oil. DRI pellets were coated with mineral oil at a rate of 1 Gal/ton. The mineral oil treated DRI pellets were then placed in a sealed steel drum. The sealed steel drum was then placed in an electrically heated oven and heated to 135° F. As summarized in Table 2 below, the CO content was analyzed and measured at different times by pulling gas samples through Sensidyne analysis columns. As illustrated, the formation of carbon monoxide was significantly reduced when the DRI pellets were coated with mineral oil. After 24 hrs, no CO (0 ppm) was detected in the sealed drum with DRI coated with mineral oil. After 90 hrs, the CO content was only 15 ppm. After 118 hrs, the CO only increased 5 ppm for a total of 20 ppm. And after 168 hrs, the CO content remained constant at 20 ppm.

TABLE 2

| Reaction time | CO content |
| --- | --- |
| 24 hrs | 0 ppm |
| 90 hrs | 15 ppm |
| 118 hrs | 20 ppm |
| 140 hrs | 20 ppm |
| 168 hrs | 20 ppm |

Reactivity Measurements

We have found no standardized test for measuring reactivity levels in DRI pellets and DRI fines. We, therefore, designed an apparatus for measuring DRI reactivity as shown in FIG. 11. A sample of DRI (coated or uncoated) was provided in a copper canister 110 placed in a water bath 111 to be able to maintain temperature control. The canister 110 had at its top a thermometer 112 to the measure temperature in the canister 110, and the temperature maintained by a heater 113 with a thermostat to control the water bath 111 in which the canister 110 is immersed. The temperature of the canister 110 may be maintained at about 65° F. Circulated through the DRI sample in the canister 110 is oxygen pumped through a circular loop 114, containing a pump 115, a flow meter 116 and an oxygen meter 117. Also in the loop 114 is a desiccator ($CaCl_2$) 118, that controls the moisture content of the oxygen flowing through the loop 114. A valve 119 was also provided and coupled to a nitrogen source 120 so that the loop 114 could be flushed before and after each test to maintain control.

The reactivity data showed that the DRI pellets and DRI fines coated with coating material to form DRI agglomerates not only reclaimed substantial amounts of DRI fines for use in steelmaking, but substantially inhibited the reactivity of the DRI to oxygen. The reduction to reactivity to oxygen makes the DRI pyrophobic during transport and handling, reducing the risk of fires consuming the DRI and increasing the iron units available to reach the steelmaking furnace.

These tests and plant observations demonstrated the benefit of the presently disclosed method. The over 50% decrease in dust observed at collection devices demonstrated the large reclaim of iron units in the form of DRI agglomerates with the present method for use in the steelmaking. The lack of oily residue on a conveyor belt also was a good indication that showed amounts of the coating material was effectively coating the DRI pellets and DRI fines. Moreover, the very substantial decrease in reactivity of DRI pellets and DRI fines to oxygen by use of the present method demonstrates the large decrease in the pyrophobic nature of DRI with use of the present method. This is a good measure of the reduction in the pyrophilic character by the DRI in reactivity that occurs in transporting DRI by conveyor, truck, barge, ship or train, or a combination thereof, with the present method. In short, as shown, the present method provided for not only a marked reclaim of DRI fines and recovery of iron units for a steelmaking facility, but also dramatically reduced the reactivity of the DRI, reducing risks of fires and other hazards during transportation.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of reclaiming and inhibiting activation of DRI fines comprising the steps of:
   a) forming a moving stream containing DRI pellets and DRI fines;
   b) coating the moving stream of DRI pellets and DRI fines with a coating material comprising an alkane mixture in the C15 to C40 range to form a coating on the DRI pellets and DRI fines and cause DRI fines to adhere together and to the DRI pellets to form a plurality of agglomerates; and c) moving the agglomerates of coated DRI pellets and coated DRI fines to a facility for use in making steel.

2. The method of reclaiming and inhibiting activation of DRI fines as claimed in claim 1 where the coating material comprises an alkane mixture in the C18 to C35 range.

3. The method of reclaiming and inhibiting activation of DRI fines as claimed in claim 1 where the coating material is at room temperature.

4. The method of reclaiming and inhibiting activation of DRI fines as claimed in claim 1 where the coating material is heated before application to form a liquid or semi-liquid mixture.

5. The method of reclaiming and inhibiting activation of DRI fines as claimed in claim 4 where the coating material is heated before application.

6. The method of reclaiming and inhibiting activation of DRI fines as claimed in claim 1 where coating material is mineral oil.

7. The method of reclaiming and inhibiting activation of DRI fines as claimed in claim 1 where the moving stream of DRI pellets and DRI fines is a falling stream when the step of coating occurs.

8. The method of reclaiming and inhibiting activation of DRI fines as claimed in claim 7 where the coating material is applied in different droplet sizes to facilitate coverage of the DRI fines and to facilitate coverage of the DRI pellets with the coating material.

9. The method of reclaiming and inhibiting activation of DRI fines as claimed in claim 1 where the coating material has a viscosity of 70 SUS at 100° F.

10. The method of reclaiming and inhibiting activation of DRI fines as claimed in claim 1 where the coating material is liquid or semi-liquid applied at a rate less than 0.2% by weight per ton of pellets and fines coated.

11. The method of reclaiming and inhibiting activation of DRI fines as claimed in claim 1 where the coating material is liquid or semi-liquid applied at a rate between 0.005 and 0.45% by weight per ton of pellets and fines coated.

12. The method of reclaiming and inhibiting activation of DRI fines as claimed in claim 1 where the coating material is applied at a rate between 0.2 and 2.0 gallons per ton of DRI coated.

13. The method of reclaiming and inhibiting activation of DRI fines as claimed in claim 1 where the DRI comprises more than 90% metallic iron.

14. A method of reclaiming and inhibiting activation of DRI fines comprising the steps of:

a) coating a pile of DRI pellets and DRI fines while DRI pellets and DRI fines are added to or removed from the pile with a coating material, said coating material comprising an alkane mixture in the C15 to C40 range, causing DRI fines to adhere together and optionally to the DRI pellets to form a plurality of DRI agglomerates; and b) moving the DRI agglomerates formed from coated DRI pellets and coated DRI fines to a facility for use in making steel.

15. The method of reclaiming and inhibiting activation of DRI fines as claimed in claim 14 where the coating material comprises an alkane mixture in the C18 to C35 range.

16. The method of reclaiming and inhibiting activation of DRI fines as claimed in claim 14 where the coating material is at room temperature.

17. The method of reclaiming and inhibiting activation of DRI fines as claimed in claim 14 where the coating material is applied at a rate between 0.2 and 2.0 gallons per ton of DRI coated.

18. The method of reclaiming and inhibiting activation of DRI fines as claimed in claim 14 where the coating material is applied at a rate at a rate less than 0.2% by weight per ton of pellets and fines coated.

19. The method of reclaiming and inhibiting activation of DRI fines as claimed in claim 14 where the coating material is liquid or semi-liquid applied at a rate between 0.005 and 0.45% by weight per ton of pellets and fines coated.

20. The method of reclaiming and inhibiting activation of DRI fines as claimed in claim 14 where the coating material is mineral oil.

21. The method of reclaiming and inhibiting activation of DRI fines as claimed in claim 14 where the coating material is at room temperature.

22. The method of reclaiming and inhibiting activation of DRI fines as claimed in claim 14 where the coating material is heated before application to form a liquid or semi-liquid mixture.

23. The method of reclaiming and inhibiting activation of DRI fines as claimed in claim 22 where the coating material is heated before application.

24. The method of reclaiming and inhibiting activation of DRI fines as claimed in claim 14 where coating material is mineral oil.

* * * * *